W. R. BETHAM.
RESILIENT PNEUMATIC INNER TUBE TIRE.
APPLICATION FILED APR. 4, 1917.
1,260,304. Patented Mar. 26, 1918.
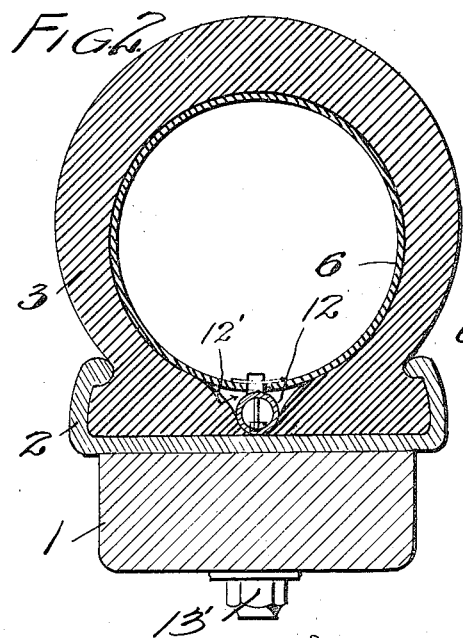
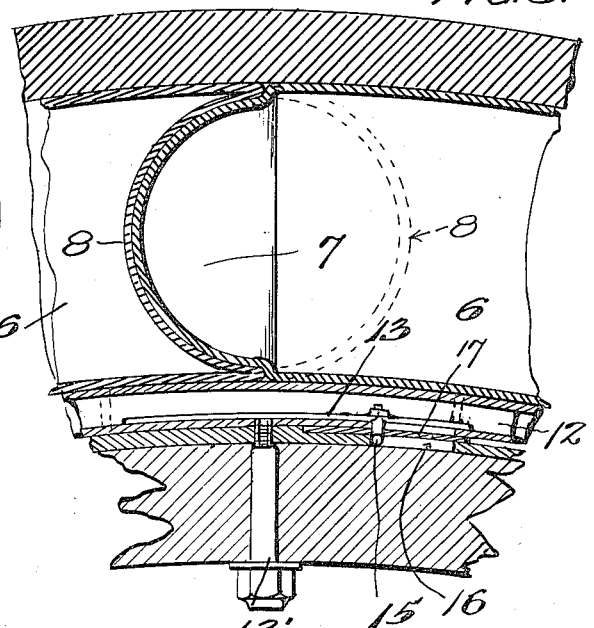
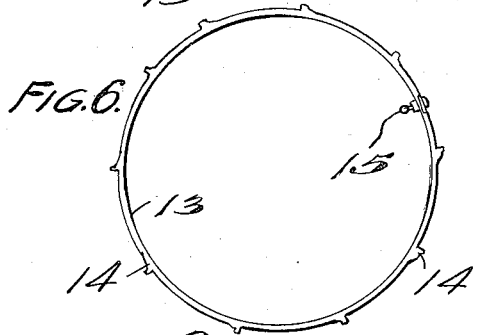
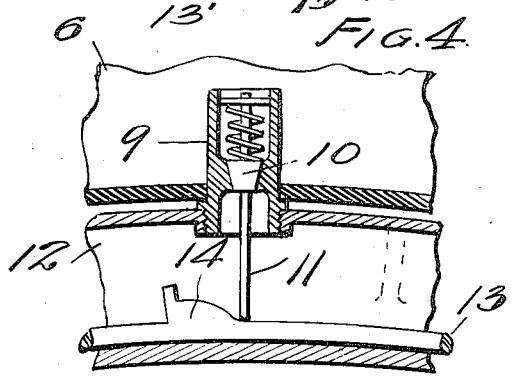
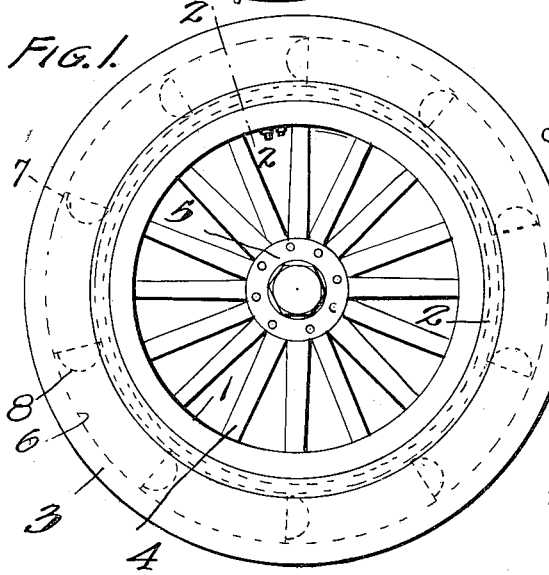
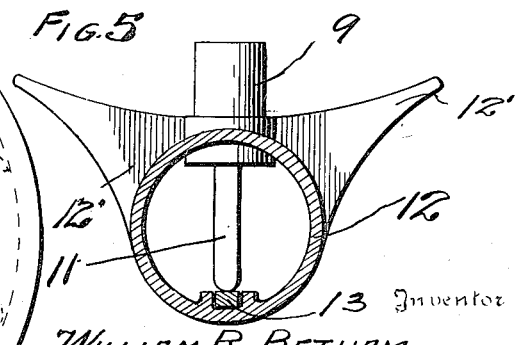
Inventor
WILLIAM R. BETHAM
By Herman A. Phillips
Attorney

UNITED STATES PATENT OFFICE.

WILLIAM R. BETHAM, OF CHICAGO, ILLINOIS.

RESILIENT PNEUMATIC INNER-TUBE TIRE.

1,260,304.  Specification of Letters Patent.  Patented Mar. 26, 1918.

Application filed April 4, 1917. Serial No. 159,637.

*To all whom it may concern:*

Be it known that I, WILLIAM R. BETHAM, citizen of the United States of America, residing at Chicago, in the county of Cook and State of Illinois, have invented certain new and useful Improvements in Resilient Pneumatic Inner-Tube Tires, of which the following is a specification.

My present invention relates to improvements in resilient pneumatic inner tube tires for automobiles and other vehicles, and particularly to that class of inner tube tires involving the use of multiple chambers or sectional members instead of a single inner tube. The primary object of the invention is the provision of a tire of the multiple chamber type, wherein the end chambers or sections of the inner tube are so constructed, combined and arranged with each other as to produce the least possible friction or likelihood of displacement and in the event of a puncture to a chamber, the pressure of the tire is automatically equalized and a cushioned base extended into the deflated chamber, so as to enable the vehicle to continue on its journey; in which the several chambers or sections, singly or severally, mounted or demounted, may be quickly inflated or deflated; and in which a durable, serviceable and economical inner tube is provided possessing the usual merits of such a tube.

The invention consists in certain novel combinations and arrangements of parts as hereinafter set forth and claimed. In the accompanying drawings I have illustrated one complete example of the physical embodiment of my invention constructed according to the best mode I have so far devised for the practical application of the principles of my invention. It will be understood, however, that changes in shape and arrangement of the different features or elements of my invention may be introduced without departing from the spirit of my claim or the scope of my invention.

Figure 1 is a side elevation showing an automobile wheel constructed according to and embodying the novel features of my invention.

Fig. 2 is an enlarged, transverse sectional view on line 2—2 of Fig. 1.

Fig. 3 is a longitudinal, sectional view of a portion of the tire at the joint between two of the multiple chambers of the inner tube.

Fig. 4 is a further enlarged view, showing in section the means for deflating the multiple chambers.

Fig. 5 is a cross section of the parts of Fig. 4 showing the supporting wings for the multiple chambers.

Fig. 6 is an edge view of the deflating ring for the multiple chambers.

In the illustration of my invention as disclosed in its preferred embodiment in the accompanying drawings I have depicted a standard automobile wheel involving the wooden felly 1, the metal rim 2 and the outer casing 3 together with the usual spokes 4 and hub 5 of well known type.

Within the outer casing is arranged the sectional inner tube comprising a series of closely related chambers 6 whose walls are of soft rubber and of curved cylindrical shape to fit within the outer casing. Each of the chambers is provided with a convex end wall 7 and an opposite concave end wall 8, and as best seen in Fig. 3 these convex and concave walls of adjoining chambers form respectively heads and sockets of hemispherical form and an interlocked joint is thus formed which produces the minimum of friction between adjoining members, holds the chambers in alined and proper position, and form a practically continuous inner tube with the additional advantageous features of a multiple chamber tube.

Each of the chambers is provided with an independent valve casing 9 and valve 10, spring pressed as usual and opening toward the chamber, while the stem 11 is elongated in order to project into the inflating pipe 12. This pipe or tube is of metal and located within the outer casing between its inner edges and the metal rim 2, and the pipe is formed with transversely extending wings 12 to fit snug up against the edges of the outer casing 3 and hold the pipe in place. Should one of these chambers be punctured, as for instance, the one indicated to the right in Fig. 3, it will readily be seen that the concave head 8 at the left will immediately be forced to the right as shown in dotted lines. This movement takes place not only in the chamber adjoining the deflated chamber, but occurs in all chambers throughout the tire, thus equalizing and distributing the pressure over the entire wheel.

The multiple chambers are each connected with the inflating pipe so that each section or chamber may be inflated and its pressure maintained independently of the others, but it is sometimes desired to deflate the chambers simultaneously and for this purpose I employ a deflating ring 13 located within the inflating pipe 12, and provided with a cam projection 14 on its outer periphery, one for each of the valve stems 11. In Fig. 4 it will be apparent that if the ring 13 is moved to the right the cam 14 will ride under the end of the stem 11, lifting the stem and opening the valve 10, and that if the inflating valve 13' (of usual form) is open the pressure in the multiple chambers and in the inflating ring or pipe 12 will be reduced. After this reduction in pressure the wheel may be readily demounted for the purpose required. Pressure may be again applied in the inflating pipe and multiple chambers by first moving the ring 13 to its normal position and then applying the pipe line or hose to the valve 13' in usual way.

To move the deflating ring 13 I employ a right angular pin or bolt 15 which is attached to the ring and projects through a slot 16 in the rim of the wheel where it is accessible for the hand, and a slide plate 17 is employed to close this slot in an air tight manner to prevent leakage from the inflating pipe.

From the above description taken in connection with my drawings it is evident that I have provided an automobile wheel of improved construction which fulfils the requirements and performs the functions of a comparatively perfect wheel of this type.

What I claim is:—

The combination in a wheel with its tire casing, of an inner tube comprising a series of inflatable, pneumatic sections each having a smooth hemispherical, convex, reversible end wall and its other end formed as a distensible wall with a concave outer surface to receive the convex end of an adjoining section, whereby, when one section is punctured the air pressure in an adjoining section will cause the reversal of the convex wall and the distension of a complementary concave wall, to support the deflated section.

In testimony whereof I affix my signature.

WILLIAM R. BETHAM.